(12) United States Patent
Witte et al.

(10) Patent No.: US 8,427,906 B2
(45) Date of Patent: Apr. 23, 2013

(54) ACOUSTIC SENSOR UTILIZING ACOUSTOELECTRIC EFFECT

(75) Inventors: Russell S. Witte, Tucson, AZ (US);
Ragnar Olafsson, Tucson, AZ (US);
Sheng-Wen Huang, Seattle, WA (US);
Timothy L Hall, Ann Arbor, MI (US);
Matthew O'Donnell, Seattle, WA (US)

(73) Assignee: The Regents of The University of Michigan, Ann Arbor, MI (US)

( * ) Notice: Subject to any disclaimer, the term of this patent is extended or adjusted under 35 U.S.C. 154(b) by 488 days.

(21) Appl. No.: 12/250,289

(22) Filed: Oct. 13, 2008

(65) Prior Publication Data
US 2010/0091613 A1 Apr. 15, 2010

(51) Int. Cl.
*G01H 17/00* (2006.01)
(52) U.S. Cl.
USPC .............. 367/149; 367/140; 367/175; 73/649
(58) Field of Classification Search .................. 367/140, 367/170, 174, 175; 73/649; 381/191
See application file for complete search history.

(56) References Cited

U.S. PATENT DOCUMENTS 5,455,475 A * 10/1995 Josse et al. ............... 310/316.01
6,898,299 B1 * 5/2005 Brooks .......................... 600/506

OTHER PUBLICATIONS

Olafsson et al., "Electric Current Mapping using the Acousto-Electric Effect", Proc. of SPIE, vol. 6147 (2006).*
R. Witte et al., "Inexpensive Acoustoelectric Hydrophone for Measuring High Intensity Ultrasound Fields," IEEE Ultrasonics Symposium, Oct. 30, 2007.
R. Witte et al., "Inexpensive Acoustoelectric Hydrophone for Measuring High Intensity Ultrasound Fields," 2007 IEEE Ultrasonics Symposium, pp. 737-740.
L.J. Busse et al., "Detection of spatially nonuniform ultrasonic radiation with phase sensitive (piezoelectric) and phase insensitive (acoustoelectric) receivers," J. Acoust. Soc. Am. 70(5), Nov. 1981, pp. 1377-1386.
L.J. Busse et al., "Response characteristics of a finite aperature, phase insensitive ultrasonic receiver based upon the acoustoelectric effect," J. Acoust. Soc. Am. 70(5), Nov. 1981, pp. 1370-1376.
A.J. Coleman et al., "Acoustic Performance and Clinical Use of a Fibreoptic Hydrophone," Ultrasound in Med. & Biol., vol. 24, 1998, pp. 143-151.
D. Dietz et al., Acoustoelectric Detection of Ultrasound Power with Composite Piezoelectric and Semiconductor Devices, IEEE Trans. on Ultrasonics, Ferroelectronics, and Frequency Control, vol. 35, Mar. 1988, pp. 146-151.
G. Harris, "Medical Ultrasound Exposure Measurements: Update on Devices, Methods, and Problems," 1999 IEEE Ultrasonics Symposium, pp. 1341-1352.
M. Schafer et al., "Design of a Miniature In-Vivo Shock Wave Hydrophone," 1990 IEEE Ultrasonics Symposium, pp. 1051-1990.
H. Zhang et al., "Acousto-electric tomography," Photons Plus Ultrasound: Imaging and Sensing, Proc. of SPIE, vol. 5320, 2004, pp. 145-149.

(Continued)

*Primary Examiner* — Ian Lobo
(74) *Attorney, Agent, or Firm* — Harness, Dickey & Pierce, P.L.C.

(57) ABSTRACT

An ultrasound system that detects a characteristic of an ultrasound wave. The system includes a circuit member defining a sensing portion operable to be exposed to the ultrasound wave. The system also includes a current generating device that generates a current in the sensing portion of the circuit member. Furthermore, the system includes a voltage sensor that detects a voltage across the sensing portion due to the exposure to the ultrasound wave to thereby detect the characteristic of the ultrasound wave.

11 Claims, 6 Drawing Sheets

OTHER PUBLICATIONS

R. Witte et al., "Acoustoelectric Detection of Current Flow in a Neutral Recording Chamber," 2006 IEEE Ultrasonics Symposium, pp. 5-8.

R. Witte et al., "Imaging current flow in lobster nerve cord using the acoustoelectric effect," 2007 Appl. Phys. Lett., vol. 90, pp. 163902-1-163902-3.

R. Olafsson et al., "Cardiac Activation Mapping Using Ultrasound Current Source Density Imaging "(UCSDI), IEEE Trans. on Ultrasonics, Ferroelectronics, and Frequency Control, vol. 56, Mar. 2009, pp. 565-574.

R. Olafsson et al., "Ultrasound Current Source Density Imaging," IEEE Trans. on Biomedical Engineering, vol. 55, Jul. 2008, pp. 1840-1848.

J. Parsons, et al., "Cost-effective assembly of a basic fiber-optic hydrophone for measurement of high-amplitude therapeutic ultrasound fields," J. Acoust. Soc. Am., vol. 119, Mar. 2006, pp. 1432-1440.

J. Jossinet et al., "The phenomenology of acousto-electric interaction signals in aqueous solutions of electrolytes," Ultrasonics, vol. 36, 1998, pp. 607-613.

Z. Wang et al., "Simulation-Based Optimization for the Acoustoelectric Hydrophone for Mapping an Ultrasound Beam," Proc. of SPIE, 2010, vol. 7629, pp. 76290Q-1-76290Q-12.

P. Ingram et al., "Fabrication and characterization of an indium tin oxide acoustoelectric hydrophone," Proc. of SPIE, 2010, vol. 7629. pp. 76290O-1-76290O-10.

R. Witte et al., "Inexpensive acoustoeletric hydrophone for mapping high intensity ultrasonic fields," J. of Appl. Phys., vol. 104, 2008, pp. 054701-3-054701-3.

* cited by examiner

ACOUSTIC SENSOR UTILIZING ACOUSTOELECTRIC EFFECT

GOVERNMENT RIGHTS

This invention was made with government support under Contract Nos. EB03451, HL 67647, and DE07057 awarded by the National Institutes of Health. The government has certain rights in the invention.

FIELD

The present disclosure relates to acoustic systems and, more particularly, relates to an acoustic sensor that utilizes the acoustoelectric effect.

BACKGROUND

This section provides background information related to the present disclosure which is not necessarily prior art.

Acoustic systems, such as ultrasound systems, are used in a wide variety of applications. For instance, ultrasound can be used for medical imaging, for non-invasive surgical techniques, for geological surveying, for leak detection, and other purposes. Typically, these systems include an ultrasound transducer or other source that emits a relatively high frequency (e.g., 1 to 5 megahertz) ultrasound beam.

Mechanical and/or fiber-optic ultrasound sensors (e.g., hydrophones) have been proposed for calibrating an ultrasound transducer or for detecting other characteristics of the ultrasound beam. However, these conventional ultrasound sensors can be prohibitively expensive. They can also be easily damaged, especially when exposed to high pressures. Furthermore, these sensors can include piezoelectric elements, and these elements may not provide sufficient sensitivity for certain applications.

SUMMARY

This section provides a general summary of the disclosure, and is not a comprehensive disclosure of its full scope or all of its features.

An acoustic system is disclosed that detects a characteristic of an acoustic wave. The system includes a circuit member defining a sensing portion operable to be exposed to the acoustic wave. The system also includes a current generating device that generates a current in the sensing portion of the circuit member. Furthermore, the system includes a voltage sensor that detects a voltage across the sensing portion due to the exposure to the acoustic wave to thereby detect the characteristic of the acoustic wave.

In another aspect, a method of detecting a characteristic of an acoustic wave is disclosed. The method includes generating a current in a sensing portion of a circuit member and exposing the sensing portion to an acoustic wave. Furthermore, the method includes detecting a voltage across the sensing portion due to the exposure of the sensing portion to the acoustic wave to thereby detect the characteristic of the acoustic wave.

In still another aspect, an acoustic sensor for an acoustic system that detects a characteristic of an acoustic wave is disclosed. The acoustic system includes a current generating device and a voltage sensor. Also, the acoustic sensor includes a circuit member defining a sensing portion operable to be exposed to the acoustic wave. The current generating device is operable to transmit a current in the sensing portion of the circuit member. Furthermore, the voltage sensor is operable to detect a voltage across the sensing portion due to the exposure to the acoustic wave to thereby detect the characteristic of the acoustic wave.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
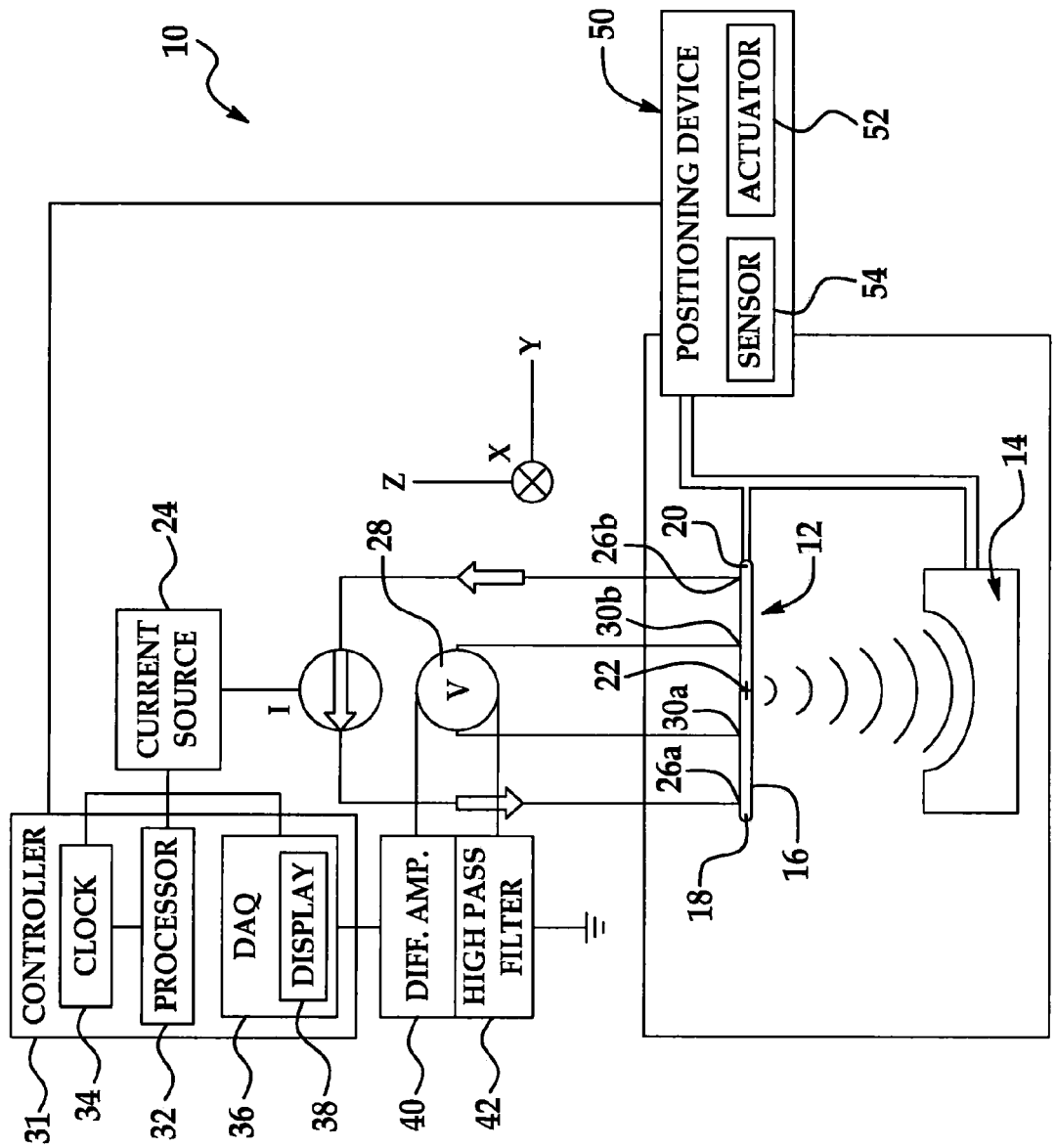
FIG. 1 is a schematic illustration of an acoustic system with an acoustic sensor according to various embodiments of the present disclosure.

Referring now to FIG. 1, an acoustic system 10 is schematically illustrated. The system 10 includes an acoustic sensor 12 and an acoustic source 14. The acoustic source 14 emits an acoustic wave, and the acoustic sensor 12 detects one or more characteristics of the emitted acoustic wave as will be discussed in greater detail below. For purposes of discussion, it will be assumed that the acoustic source 14 emits an ultrasonic wave and that the acoustic sensor 12 detects the characteristics of the ultrasound; however, it will be appreciated that the acoustic source 14 could emit an acoustic wave of any suitable frequency, such as sonar, etc., and that the acoustic sensor 12 could be adapted to detect the characteristics of these acoustic waves. In some embodiments, the source 14 is a 540 kHz single-element annular transducer driven by a pulse-receiver (Model number 5077PR available from Panametrics, Inc.) or other known ultrasound transducer.

Generally, the acoustic sensor 12 includes a circuit member 16. In some embodiments, the circuit member 16 is made out of an electrically conductive material, such as graphite, copper tape (e.g., 50 µm thickness), PDMS, and the like; however, the circuit member 16 can be made out of any suitable material. The circuit member 16 includes a first portion 18, a second portion 20, and a sensing portion 22 between the first and second portions 18, 20. As will be described in greater detail below, the sensing portion 22 is exposed to the ultrasound beam in order to detect characteristics, such as the pressure, frequency, intensity, and/or relative position of the ultrasound beam.

Furthermore, the system 10 includes a current generating device 24. The current generating device 24 is electrically connected to the first and second portions 18, 20 of the circuit member 16 via first electrodes 26a, 26b. The first electrodes 26a, 26b can be made out of any suitable material, such as silver, silver chloride, stainless steel, platinum iridium, or other conductive material. The current generating device 24 is operable for generating a current (i.e., a gain current) through the first portion 18, the sensing portion 22, and the second portion 20. In some embodiments, the current generating device 24 generates an alternating (AC) current (e.g., approximately 100 Hz) in the circuit member 16; however, a direct current (DC) could also be applied without departing from the scope of the present disclosure. Also, in some embodiments, the current generating device 24 generates a variable current level in the circuit member 16. It will be appreciated that the current generating device 24 could be of any suitable type, such as a constant current source, voltage generator, function generator, audiodriver, or any other suitable device.

In addition, the system 10 includes a voltage sensor 28. The voltage sensor 28 is electrically connected to the first and second portions 18, 20 of the circuit member 16 via second electrodes 30a, 30b. The second electrodes 30a, 30b can be made out of any suitable material, such as AgCl, stainless steel, or other conductive material. As will be described, the voltage sensor 28 is operable for detecting a voltage across the sensing portion 22.

In some embodiments, the first and second electrodes 26a, 26b, 30a, 30b are combined. As such, the current generating device 24 and voltage sensor 28 are operably connected to a single pair of electrodes is used to transmit current through the sensing portion 22 and to detect the voltage in the sensing portion 22.

The system 10 also includes a controller 31 that generally controls the various functions of the system 10. The controller 31 includes a processor 32, such as a microprocessor, that is operatively coupled with a clock 34. In some embodiments, the processor 32 includes an integrated circuit, such as a field-programmable gate array (FPGA).

Moreover, the controller 31 includes a data acquisition system 36. The system 36 can be of any suitable type, such as a 12-bit, 100 MHz acquisition board available from Signatec Inc. The data acquisition system 36 is in communication with the processor 32 and with the current generating device 24 and the voltage sensor 28 for obtaining data therefrom. In some embodiments, the data acquisition system 36 includes a display 38, such as a video screen for displaying numerical data, for producing images representative of the ultrasound, and the like. Also, in some embodiments, the data acquisition system 36 includes an associated printing device for printing hard copies of the acquired data.

In some embodiments, the system 10 includes a filter device 40 and an amplifier 42, each of which is operatively connected to the voltage sensor 28. The filter device 40 can be of any suitable type, such as a high pass filter.

Additionally, the system 10 can include a positioning device 50. The positioning device 50 can be operatively coupled to the controller 31 for receiving control signals therefrom and for transmitting data thereto. Also, the positioning device 50 can be operatively coupled to the acoustic source 14 and/or the circuit member 16. More specifically, the positioning device 50 can include an actuator 52 for moving the acoustic source 14 and circuit member 16 relative to each other (i.e., the actuator 52 can be configured to move the acoustic source 14 and/or the circuit member 16). The actuator 52 can be of any suitable type, such as an actuator with an electric motor, a pneumatic motor, or otherwise. Also, the positioning device 50 can include a position sensor 54 that detects the position of the sensing portion 22. It will be appreciated that the position sensor 54 can be of any suitable type, such as a linear position sensor, or otherwise. In some embodiments, the position sensor 54 detects the position of the sensing portion 22 in order to determine the position of the sensing portion 22 relative to the acoustic source 14. The position sensory 54 can detect the positions according to a three-dimensional axis (x, y, z) as represented in FIG. 1. As will be discussed in greater detail, the position data can be communicated to the data acquisition system 36 in order to locate (i.e., map) the ultrasound emitted from the source 14.

It will be appreciated that the positioning device 50 could rely on manual movement of the circuit member 16 and/or the acoustic source 14 instead of the actuator 52. It will also be appreciated that the sensor 54 can detect position data according to any suitable coordinate system, including a two-dimensional coordinate system, a polar coordinate system, and the like.

Generally speaking, the current generating device 24 causes a predetermined level of current to flow in the sensing portion 22, and the acoustic source 14 exposes the sensing portion 22 to the ultrasound beam. The voltage sensor 28 detects the voltage across the sensing portion 22, and the signal is filtered by the filter device 40 and amplified by the amplifier 42. The resultant voltage data is communicated to the data acquisition system 36, and the processor 32 processes the data in order to detect the characteristics of the ultrasound beam. In some embodiments, the current generated by the current generating device 24 is varied in order to change the sensitivity of the sensing portion 22 to the ultrasound as will be discussed.

In some embodiments, the frequency and/or pressure of the ultrasound at the sensing portion 22 is detected in this manner. Also, in some embodiments, the sensor 54 detects the position of the sensing portion 22 relative to the source 14, and thus, the characteristics of the ultrasound are detected at known positions on the coordinate system (x, y, z). Furthermore, in some embodiments, the characteristics of the ultrasound are detected at multiple times, for instance, to detect any change in the ultrasound characteristics over time.

Specifically, the ultrasound characteristics are detected according to the acoustoelectric effect (AE effect) on the sensing portion 22. The AE effect is discussed in detail in applicants' co-pending U.S. patent application Ser. No. 12/019,225, filed Jan. 24, 2008, which is hereby incorporated by reference in its entirety.

Generally speaking, the AE effect is a known phenomenon in which an acoustic pressure wave P traveling in a medium induces a local change in conductivity σ according to:

$$\frac{d\sigma}{\sigma} = k_1 dP \quad (1)$$

with $k_1$ being an interaction constant. In some embodiments, for instance, $k_1$ is on the order of 0.01-0.1% per MPa (e.g., in physiologic saline). Thus, when a pressure wave P intersects a current field i in a uniform conducting medium, the change in conductivity leads to a voltage modulation v between two recording electrodes of resistance $R_0$ adjusted by an interaction constant $k_2$:

$$dv = k_2 i R_0 dP \quad (2)$$

Finally, the general form of a propagating ultrasound beam pattern can be expressed as:

$$P_0 a\left(t - \frac{z}{c}\right) b(x, y, z) \quad (3)$$

where b(x, y, z) represents the ultrasound beam pattern at coordinates x, y, and z, $P_0$ represents the amplitude of the pressure pulse, a(t) represents the ultrasound pulse waveform, and c represents the speed of sound. In the case of mapping an ultrasound beam pattern, it follows from equation (3) that b(x, y, z) is the unknown parameter one wishes to measure and that $P_0$ and a(t) are controlled by a function generator or transmitter's excitation pulse. Finally, based on the AE signal equation disclosed in J. Jossinet, B. Lavandier, and D. Cathignol, "Impedance modulation by pulsed ultrasound," Ann. NY Acad. Sci., vol. 873, pp. 396-407, 1999 (hereby incorporated by reference in its entirety) and adding the general form of the ultrasound equation and lead-field theory for detecting the AE induced voltage in a conductive medium, one arrives at a general form of the AE signal by the second electrodes 30a, 30b when the ultrasound has moved to position x1, y1:

$$V(x_1, y_1, t) = \quad (4)$$
$$k_1 \int \int \int \frac{\tilde{J}^L(x, y, z) \cdot J^I(x, y, z)}{\sigma(x, y, z)} b(x - x_1, y - y_1, z_1) P_0 a\left(t - \frac{z}{c}\right) dx\,dy\,dz$$

such that $\tilde{J}^L$ denotes the lead field of the electrical recording system and $J^I$ represents the current distribution.

Thus, the processor 32 can utilize equation (4) to detect characteristics of the ultrasound. More specifically, it follows from equation (4) that the detected AE voltage depends on the recording electrode lead fields of the second electrodes 30a, 30b, the conductivity of material in the sensing portion 22, the current field supplied by the current generating device 24, and the detected parameters of the acoustic system 10, including the unknown beam pattern and known excitation pulse. Moreover, properties of the ultrasound propagation can be accurately mapped in both time and space when either the other variables are known or fixed. Also, an absolute measure of $P_0$ in MPa can be calculated based on the known physical parameters of the conducting medium.

Figure 2:
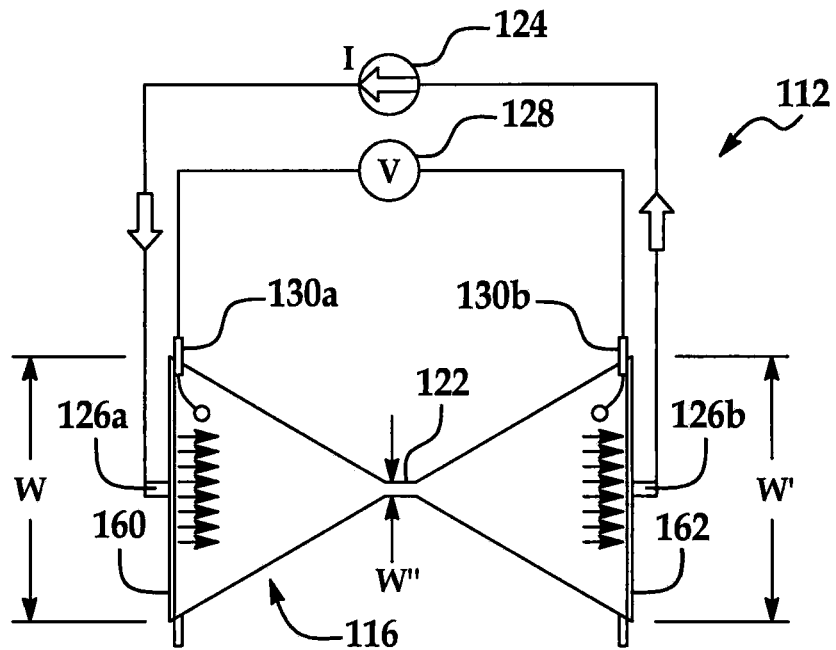
FIG. 2 is a schematic illustration of an exemplary embodiment of the acoustic sensor for use in association with the acoustic system of FIG. 1.

Referring now to FIG. 2, an exemplary embodiment of the acoustic sensor 112 with a circuit member 116 is illustrated. It will be appreciated that the acoustic sensor 112 and circuit member 116 can be used in association with the system 10 of FIG. 1. It will be appreciated that the circuit member 116 can be mounted to a substrate (not shown), such as a MYLAR™ substrate, in any suitable manner. Also, it will be appreciated that components of FIG. 2 that are similar to the components of FIG. 1 are indicated by corresponding reference numerals increased by 100.

As shown in the embodiment represented in FIG. 2, the circuit member 116 can be substantially shaped like a bowtie. Specifically, the circuit member 116 can include a first portion 160 and a second portion 162. The first and second portions 160 each have a tapered shape and are inverted with respect to each other.

The sensing portion 122 is disposed between the first and second portions 160, 162. The sensing portion 122 electrically couples the first and second portions 160, 162. In some embodiments, the sensing portion 122 is a separate resistor that is electrically connected at each end to one of the first and second portions 160, 162. In other embodiments, the sensing portion 122 and the first and second portions 160, 162 are integrally coupled so as to be monolithic. In other embodiments, the first and second portions 160, 162 are frusto-conic (i.e., three-dimensional) in shape and are arranged so as to have a longitudinal cross section similar to that shown in FIG. 2. In still other embodiments, the first and second portions 160, 162 are substantially half conic so as to define a flat surface along the axes of the first and second portions 160, 162, and the flat surface is mounted to a substrate.

Accordingly, the first portion 160 defines a first width W, and the second portion 162 defines a second width W'. In some embodiments, the first and second width dimensions W, W' are substantially equal. Also, the sensing portion 122 defines a third width W" that is substantially less than the first and second width dimensions W, W'.

Also, in some embodiments, the length (i.e., perpendicular to the width W, W', W" dimensions) of the sensing portion 122 is relatively small compared to the overall length of the circuit member 116. In some embodiments, for instance, the overall length is approximately equal to one millimeter (1 mm) while the length of the sensing portion is less than 100 micrometers (<100 μm).

The first electrodes 126a, 126b are electrically connected to the first and second portions 160, 162, respectively. Also, the second electrodes 130a, 130b are electrically connected to the first and second portions 160, 162, respectively.

Moreover, in some embodiments, other components are added on the circuit member 116. For instance, in some embodiments, a conductive gel (e.g., 2% Agarose, 2% NaCl in diH2O) is added on top of the circuit member 116 away from the sensing portion 122 to improve electrical coupling between the electrodes 126a, 126b, 130a, 130b and the first and second portions 160, 162. Furthermore, in some embodiments, mineral oil is used to cover the circuit member 116 for electrical isolation and to enable ultrasound to pass through with reduced surface reflections. Additionally, in some embodiments, the circuit member 116 is coated with a water-resistant, insulating thin layer of rubber cement to protect against the intrusion of water.

In some embodiments, the circuit member 116 is oriented within the system of FIG. 1 such that the sensing portion 122 is oriented substantially within the X-Y plane illustrated in FIG. 1. Also, in some embodiments, the ultrasound from the source 14 is transmitted substantially along the Z-axis illustrated in FIG. 1.

It will be appreciated that because the dimensions of the sensing portion 122 is substantially less than the dimensions of the first and second portions 160, 162, the current density is increased in the sensing portion 122 for greater detection sensitivity. It will also be appreciated that the size of the sensing portion 122 can approximate that of a single point (e.g., a maximum of approximately half of a wavelength of the ultrasound) to act as a point detector to map (i.e., locate) the ultrasound beam pattern with a relatively high spatial resolution.

In addition, it will be appreciated that the circuit member 116 can be made from relatively inexpensive materials. Accordingly, ultrasound characteristics can be detected with a high degree of accuracy, and yet the system 10 can be relatively inexpensive. In some embodiments, the circuit member 116 can even be made out of disposable materials for greater convenience.

Furthermore, the circuit member 116 can be relatively small and compact for greater utility. For instance, the circuit member 116 can be incorporated into a catheter such that the circuit member 116 can be introduced into a human body. As such, the circuit member 116 can be incorporated into a medical system for detecting the location of an ultrasound wave in the human body, for instance, in high intensity focused ultrasound (HIFU) therapies.

Thus, an exemplary embodiment of the operation of the system 10 with the sensor 112 can be discussed in greater detail. It will be appreciated that the controller 31 can transmit control signals to the components of the system 10 for these operations.

Initially, an alternating current (i.e., the bias current) of approximately 100 Hz can be applied to the sensing portion 22 by the current generating device 24. Also, the acoustic source 14 can emit a pulsed ultrasound signal at approximately the peak or trough of the applied current. Then, the voltage signal can be detected by the voltage sensor 28. It will be appreciated that the system 10 can rely on the clock 34 to substantially synchronize the operation of the current generating device 24, the acoustic source 14, and the voltage sensor 28 for operating in this manner. The voltage detected by the voltage sensor 28 can be differentially amplified by the amplifier 42, and high-pass filtered by the filter device 40 to isolate the ultrasound modulated component, and these acoustoelectric (AE) signals are captured by the data acquisition system 36. A distant electrode can be used as a ground reference for differential recording (see FIG. 1). Furthermore, the AE signals generated at +i and −i can be subtracted to reduce common mode interference.

Because the AE signal depends on the phase and magnitude of the ultrasound pressure wave field, three-dimensional images of the beam pattern can be captured by moving the acoustic source 14 (or steering the beam) with the actuator 52 relative to the sensing portion 122. Alternatively, the actuator 52 can move the sensing portion 122 relative to the ultrasound beam to create a three-dimensional beam pattern. This assumes a predictable or known current source density (e.g., produced from a constant DC or sinusoidal waveform in a homogenous conducting medium), which can be controlled with a function generator, as described, above. Also, the resolution along the Z-axis (FIG. 1) is preserved and can provide an average estimate of the pressure field, which is a highly desirable parameter for real-time monitoring in various HIFU applications.

Moreover, in some embodiments, the current through the sensing portion 122 is varied to change the sensitivity of the sensing portion 122. This is because the AE signal is linear and proportional to the current transmitted. Thus, for smaller levels of ultrasound, the current can be increased to increase the detecting sensitivity.

Figure 3:
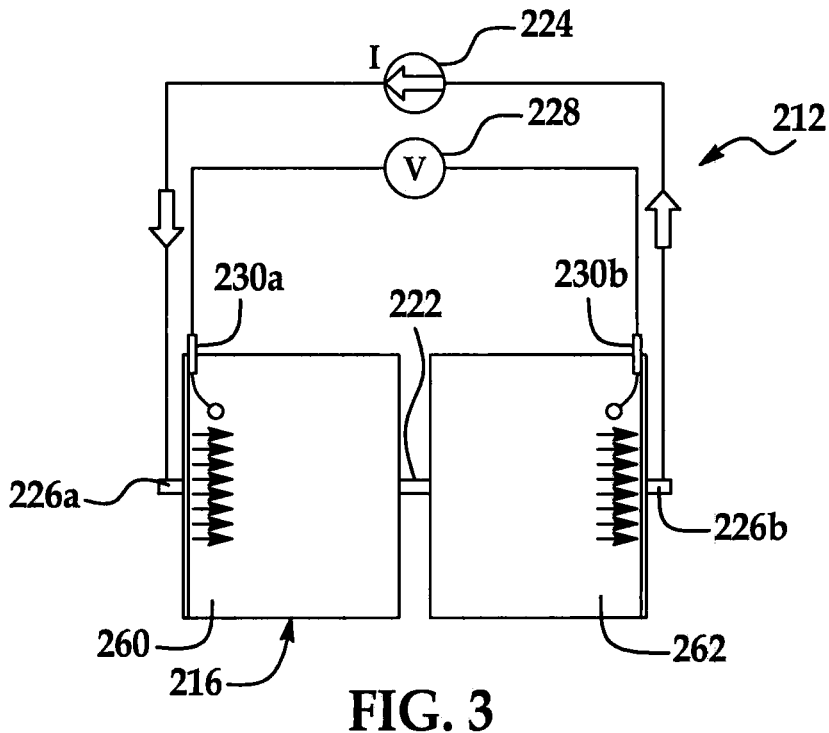
FIG. 3 is a schematic illustration of another exemplary embodiment of the acoustic sensor.

Referring now to FIG. 3, another embodiment of the circuit member 216 is illustrated. It will be appreciated that components that are similar to those of the embodiment of FIG. 1 are indicated with similar reference numerals increased by 200.

As shown, the circuit member 216 includes a generally rectangular first portion 260 and a generally rectangular second portion 262. The sensing portion 222 is disposed between the first and second portions 260, 262. As stated above, the sensing portion 222 can be separate from or integrally coupled with the first and second portions 260, 262. Similar to the embodiment of FIG. 2, the width of the sensing portion 222 is substantially less than that of the first and second portions 260, 262 such that the sensing portion 222 achieves the advantages discussed above.

Figure 4:
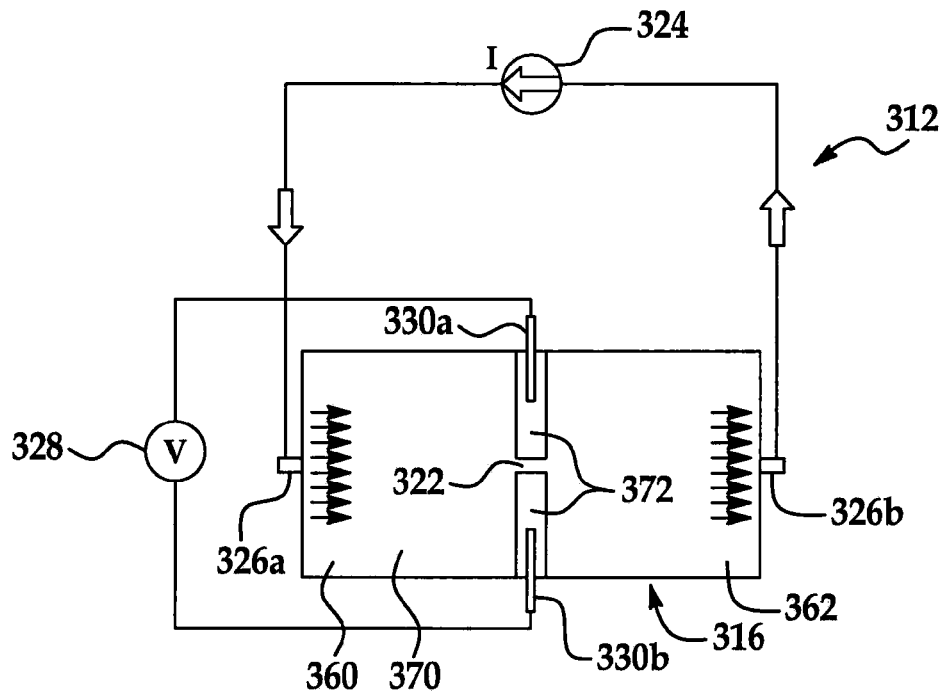
FIG. 4 is a schematic illustration of another exemplary embodiment of the acoustic sensor.

Referring now to FIG. 4, another embodiment of the circuit member 316 is illustrated. It will be appreciated that components that are similar to those of the embodiment of FIG. 1 are indicated with similar reference numerals increased by 300.

As shown, the circuit member 316 includes a first and second portion 360, 362 and a sensing portion 322 therebetween, similar to the embodiment of FIG. 3. The first and second portion 360, 362 and the sensing portion 322 are made of higher conductivity portion 370. Also, the sensing portion 322 is disposed on a lower conductivity portion 372, which has a lower electrical conductivity than the higher conductivity portion 370. The first electrodes 326a, 326b are electrically connected to the first and second portions 360, 362, respectively. As such, the current generating device 324 generates current through the higher conductivity portion 370. Furthermore, the second electrodes 330, 330b are electrically connected to the lower conductivity portion on opposite sides of the sensing portion 322. Thus, the voltage sensor 328 detects voltage across the lower conductivity portion 372.

Figure 5:
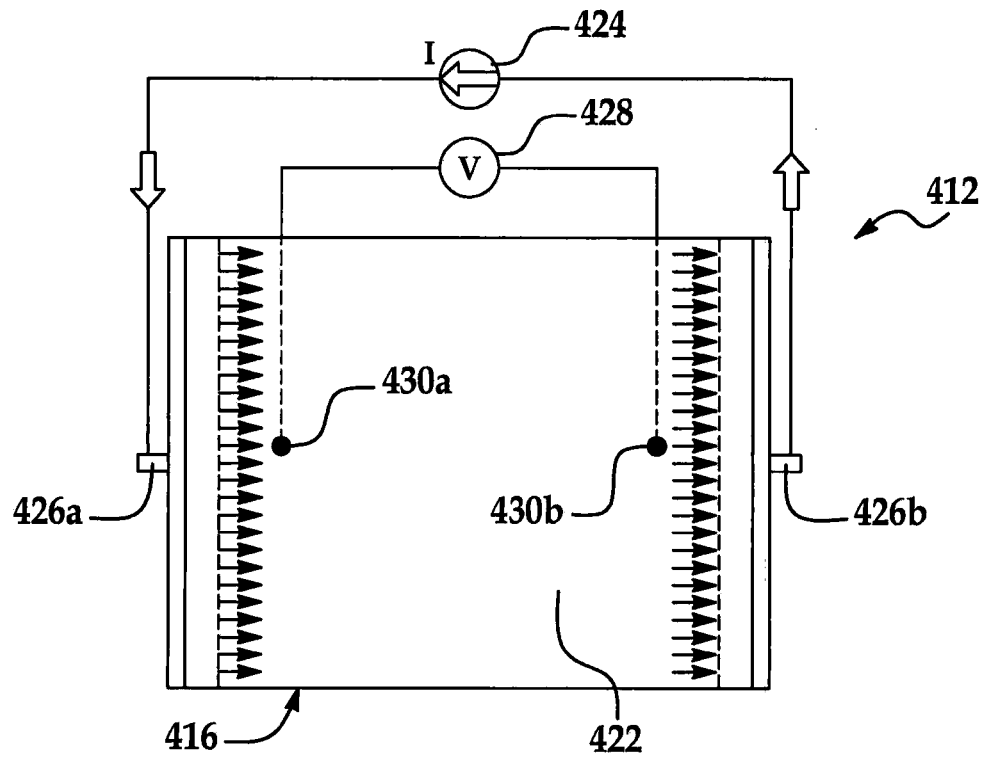
FIG. 5 is a schematic illustration of another embodiment of the acoustic sensor.

Turning now to FIG. 5, still another exemplary embodiment of the acoustic sensor 412 and circuit member 416 is illustrated. It will be appreciated that components that are similar to those of the embodiment of FIG. 1 are indicated with similar reference numerals increased by 400.

As shown, the circuit member 416 is substantially rectangular with a substantially constant width. The first electrodes 426a, 426b are electrically connected to opposite sides of the circuit member 416. The second electrodes 430a, 430b are also electrically connected to opposite sides of the circuit member 416. The sensing portion 422 is defined between the first electrodes 426a, 426b and between the second electrodes 430a, 430b. It will be appreciated that the circuit member 416 can be constructed relatively easily because of its relatively simple profile, and yet the circuit member 416 can accurately detect various ultrasound characteristics (e.g., acoustic pressure).

Figure 6:
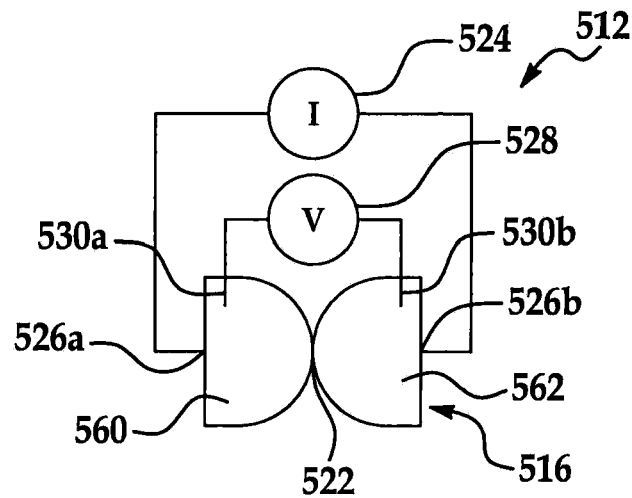
FIG. 6 is a schematic illustration of still another embodiment of the acoustic sensor.

Next, referring to FIG. 6, an additional exemplary embodiment of the acoustic sensor 512 and circuit member 516 is illustrated. It will be appreciated that components that are similar to those of the embodiment of FIG. 1 are indicated with similar reference numerals increased by 500.

As shown, the circuit member 516 includes a first portion 560 and a second portion 562 that are tapered so as to be substantially rounded and convex. Also, the first and second portions 560, 562 are inverted relative to each other so as to define the sensing portion 522 therebetween.

Referring now to FIGS. 7A-7F, various exemplary graphs are shown, which illustrate the types of ultrasound characteristics that can be detected using the acoustic system 10 discussed above. For purposes of simplicity, the acoustic sensor 12 represented in FIG. 1 will be referred to in the discussion of FIGS. 7A-7F; however it will be appreciated that any of the sensors 12, 112, 212, 312, 412, 512 could be used to detect the characteristics shown in FIGS. 7A-7F. It will also be appreciated that the characteristics represented in FIGS. 7A-7F are only examples, and other characteristics can be detected without departing from the scope of the present disclosure. Furthermore, the characteristics can be illustrated in any fashion other than those shown in FIGS. 7A-7F without departing from the scope of the present disclosure.

Figure 7A:
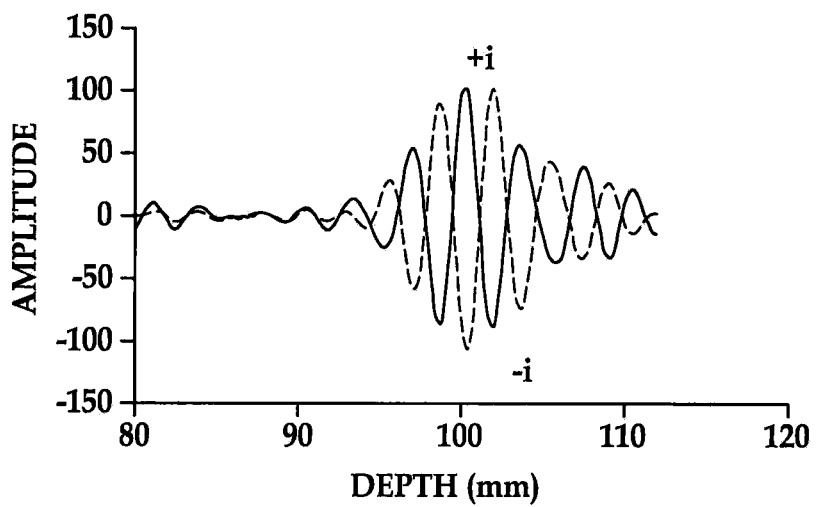
FIGS. 7A-7F are graphs illustrating acoustic characteristics detected with the acoustic system of FIG. 1.

In FIG. 7A, the detected amplitude of the acoustoelectric signal (as determined according to the voltage detected by the second electrodes 30a, 30b) is graphed on the Y-axis, and the position of the sensor 12 relative to the source 14 is graphed on the X-axis. In the embodiment illustrated, the current generating device 24 supplies an alternating current; thus, both positive and negative current are represented (in solid and broken lines, respectively).

Figure 7B:
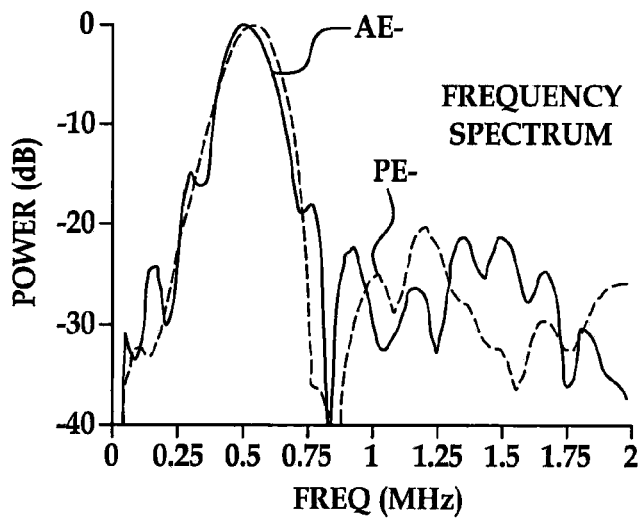

In FIG. 7B, the power spectrum of the ultrasound is represented. As shown, the power spectrum detected by the sensor 12 of FIG. 1 is illustrated with a solid line, and the power spectrum detected by a conventional pulse-echo detection system is also illustrated with a broken line. As shown, the two frequency response of the sensor 12 substantially matches that of the conventional pulse-echo detection system.

Figure 7C:
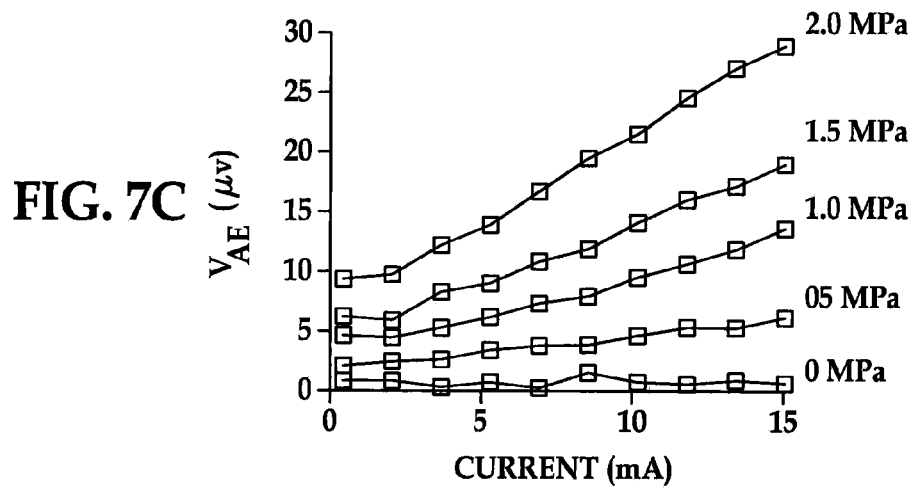

FIG. 7C illustrates the amplitude of the acoustoelectric signal at five ultrasound pressures and ten bias current levels. As shown, the acoustoelectric signal is linearly proportional to both the bias current supplied by the current generating device 24 and the acoustic pressure as predicted by equation (2).

Figure 7D:
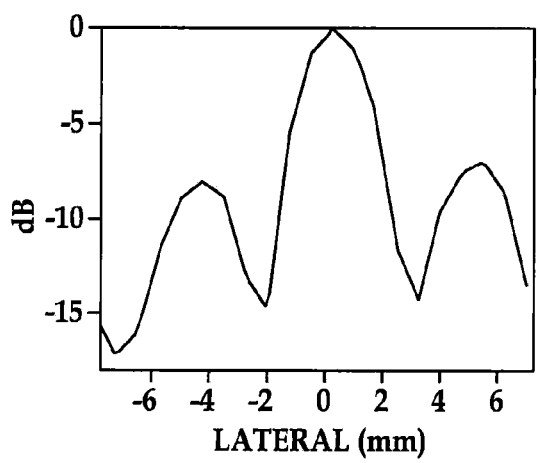
Figure 7E:
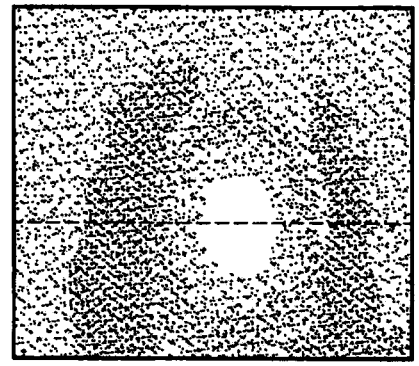
Figure 7F:
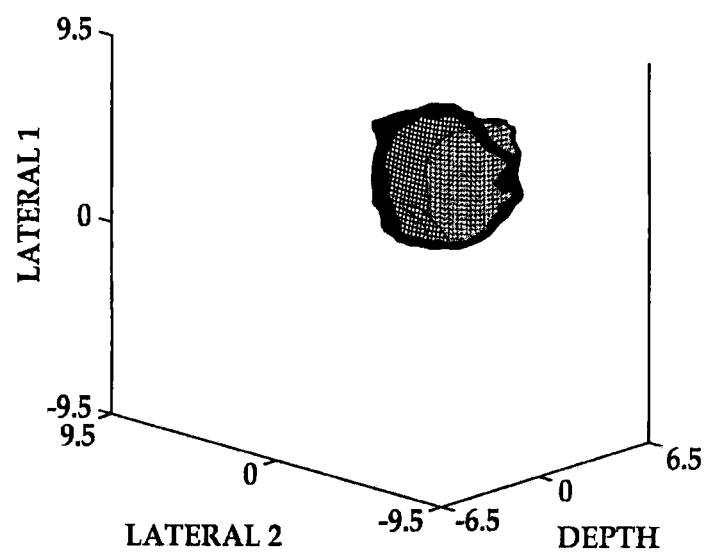

FIGS. 7D, 7E, and 7F illustrate the positional characteristics of the ultrasound. In the embodiment shown in FIG. 7D, the beam profile across one axis (e.g., the Y-axis of FIG. 1) is graphed. Also, in the embodiment shown in FIG. 7E, a two-dimensional image is created by obtaining the profiles within a plane (e.g., the Z-Y plane of FIG. 1). (The beam profile along the broken line of FIG. 7E is illustrated graphically in FIG. 7D.) It will be appreciated that the darker areas of the image represent areas within the plane having higher detected voltages detected by the voltage sensor 28. Furthermore, in FIG. 7F, a three-dimensional image of the beam pattern is generated by obtaining the profiles similar to FIGS. 7D and 7E within a three-dimensional space (e.g., within the X-Y-Z coordinate system of FIG. 1).

Accordingly, the acoustic system 10 can accurately calibrate an ultrasound transducer and measure and image the ultrasound beam pattern in two or three dimensions. Furthermore, the acoustic sensor 12-512 is very sensitive, provides high resolution, and is highly robust. Furthermore, the acoustic sensor 12-512 can be manufactured relatively easily and at a relatively low cost, making it potentially reusable or disposable. Also, the device provides a flat frequency response and offers minimal disturbance of the propagating ultrasound pressure field, making it attractive for many applications that require real-time probing of the ultrasound field. Thus, the device is suitable for wide array of applications from biomedical (e.g., high intensity focused ultrasound therapies for noninvasive surgery) to geological (e.g., probing for conductive layers or fissures below the Earth's surface) to nondestructive testing.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An acoustic system that detects a characteristic of an acoustic wave, the acoustic system comprising:
    a circuit member defining a sensing portion operable to be exposed to the acoustic wave;
    a current generating device that generates a predetermined current in the sensing portion of the circuit member while the sensing portion is exposed to the acoustic wave;
    a voltage sensor that detects a voltage across the sensing portion while the predetermined current flows in the sensing portion and while the sensing portion is exposed to the acoustic wave, the voltage being a combination of a predetermined voltage resulting from the predetermined current and an unknown voltage generated from the acoustic wave;
    a processor that calculates the unknown voltage to detect the characteristic of the acoustic wave; and
    a position sensor that detects a position of the sensing portion in order to detect a position characteristic of the acoustic wave.

2. The acoustic system of claim 1, further comprising a display device that produces an image of the acoustic wave based on the position characteristic of the acoustic wave.

3. The acoustic system of claim 1, wherein the processor calculates the unknown voltage to thereby detect a pressure characteristic of the acoustic wave.

4. The acoustic system of claim 1, further comprising an acoustic source and a clock operable for substantially synchronizing the current generating device, the voltage sensor, and the acoustic source for detecting the characteristic of the acoustic wave.

5. The acoustic system of claim 1, wherein the circuit member includes a higher conductivity portion and a lower conductivity portion, wherein the current generating device generates the current in the higher conductivity portion, and wherein the voltage sensor detects the voltage across the lower conductivity portion.

6. The acoustic system of claim 1, wherein the current generating device is operable for varying the current generated in the sensing portion.

7. The acoustic system of claim 1, further comprising an amplifier that amplifies a signal detected by the voltage sensor.

8. The acoustic system of claim 1, further comprising a filter for filtering a signal detected by the voltage sensor.

9. An acoustic system that detects a characteristic of an acoustic wave, the acoustic system comprising:
    a circuit member defining a sensing portion operable to be exposed to the acoustic wave;
    a current generating device that generates a current in the sensing portion of the circuit member; and
    a voltage sensor that detects a voltage across the sensing portion due to the exposure to the acoustic wave to thereby detect the characteristic of the acoustic wave,
    wherein the circuit member includes a first portion and a second portion, wherein the sensing portion electrically couples the first and second portions, the first portion defining a first width dimension, the second portion defining a second width dimension, and the sensing portion defining a third width dimension, wherein the third width dimension is less than the first width dimension and the second width dimension.

10. The acoustic system of claim 9, wherein the first portion is tapered and the second portion is tapered.

11. An acoustic sensor for an acoustic system that detects a characteristic of an acoustic wave, the acoustic system including a current generating device, a voltage sensor, a processor, and a position sensor, the acoustic sensor comprising:
    a circuit member defining a sensing portion operable to be exposed to the acoustic wave;
    wherein the current generating device is operable to generate a predetermined current in the sensing portion of the circuit member while the sensing portion is exposed to the acoustic wave;
    wherein the voltage sensor is operable to detect a voltage across the sensing portion while the predetermined current flows in the sensing portion and while the sensing portion is exposed to the acoustic wave, the voltage being a combination of a predetermined voltage resulting from the predetermined current and an unknown voltage generated from the acoustic wave;

wherein the processor is operable to calculate the unknown voltage to detect the characteristic of the acoustic wave, and wherein the position sensor is operable to detect a position of the sensing portion in order to detect a position characteristic of the acoustic wave.

\* \* \* \* \*